United States Patent [19]

Simmons et al.

[11] 4,068,733

[45] Jan. 17, 1978

[54] CONTROL LINKAGE FOR CROSSING PIVOTAL JOINT

[75] Inventors: Gerald Paul Simmons, Washington; Frank August Grooss, Morton, both of Ill.

[73] Assignee: Caterpillar Tractor Co., Peoria, Ill.

[21] Appl. No.: 702,167

[22] Filed: July 2, 1976

[51] Int. Cl.² ............................................ B60K 23/00
[52] U.S. Cl. ...................................... 180/77 R; 64/4; 74/481; 180/14 R; 280/420; 403/53
[58] Field of Search .................... 280/420; 180/51, 52, 180/77 R, 14 R, 14 D, 134-139; 64/24, 4; 403/53, 54; 74/479, 481, 491

[56] References Cited

U.S. PATENT DOCUMENTS

| 2,030,511 | 2/1936 | Gruber | 180/14 R |
| 3,312,301 | 4/1967 | Hagen | 180/139 |

Primary Examiner—Joseph F. Peters, Jr.
Assistant Examiner—John A. Pekar

Attorney, Agent, or Firm—Wegner, Stellman, McCord, Wiles & Wood

[57] ABSTRACT

Multiple control linkages are provided between pivotally connected frames of a vehicle such that no change in the linkage geometry takes place due to the pivotal movement of one frame relative to the other. Specifically, in single or double articulated vehicles, the control levers or pedals are mounted on a first frame with the function that is to be operated being mounted on a second frame that is pivotally connected to the first frame about a pivot. Translation motion of links by movement of the levers or pedals is converted to rotary motion, which motion is transmitted from elements on the first frame by double universal joints to elements on the second frame where the rotary motion is converted to translation or other motion for controlling the operation of a functional piece of equipment, such as the throttle, transmission range or direction selection, or the bucket lift or tilt control. Linear slip is provided for the universal joints to accommodate for changes of length caused by turning one frame relative to the other.

14 Claims, 5 Drawing Figures

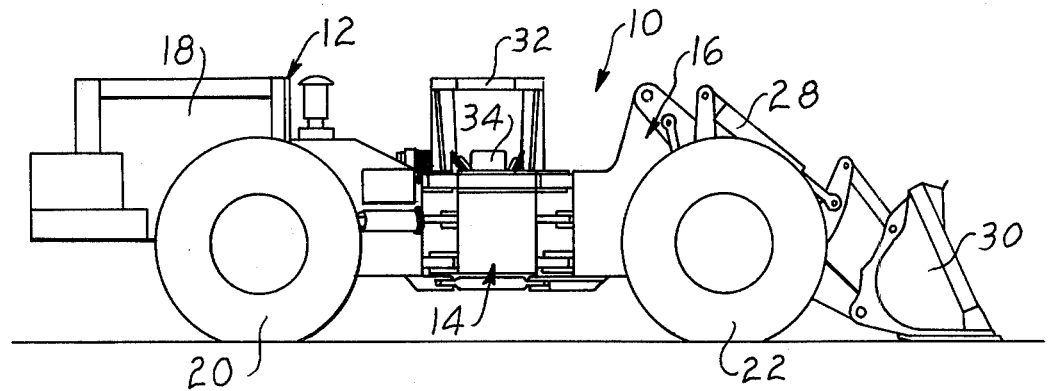
Fig_1_
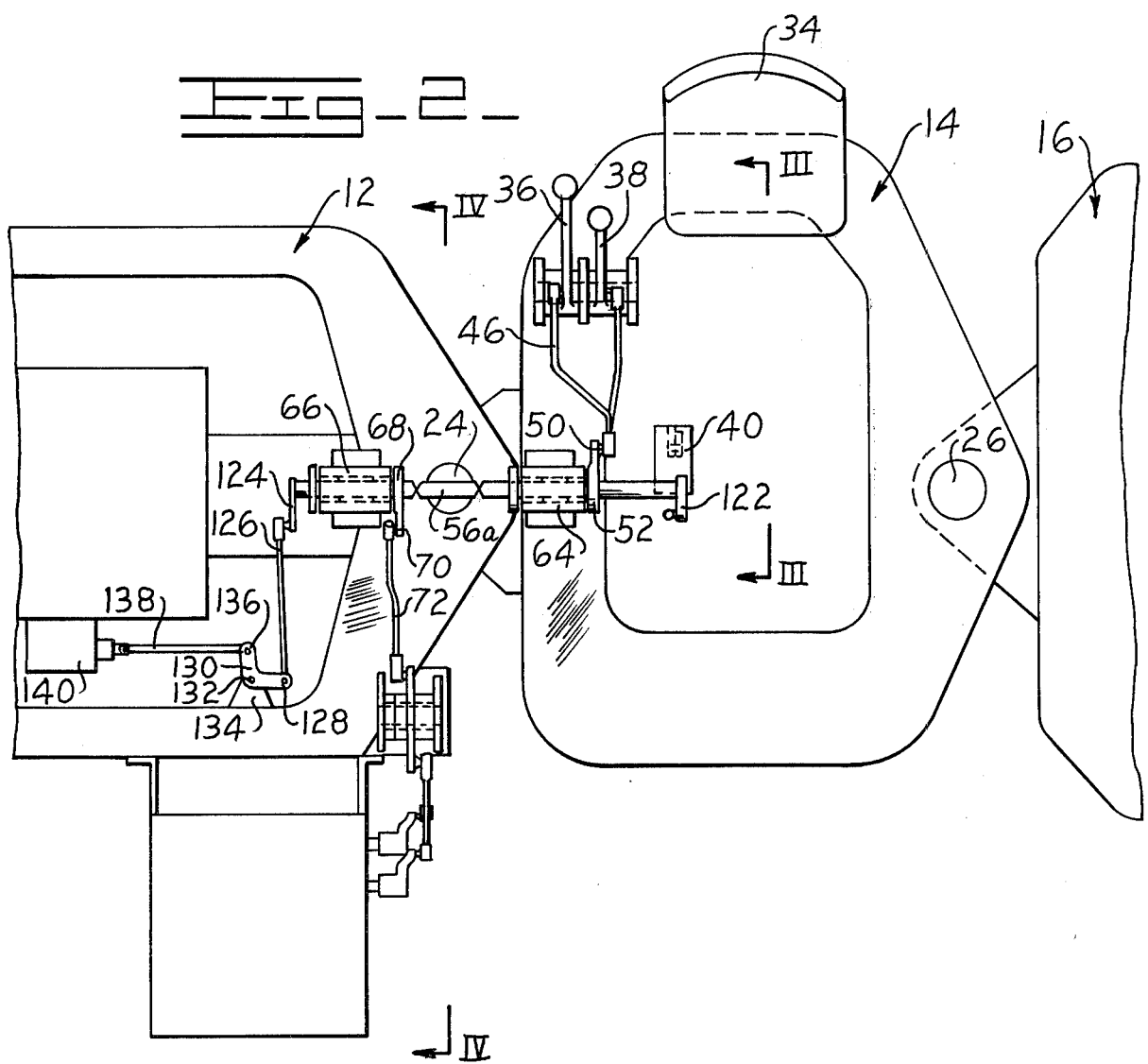
Fig_2_

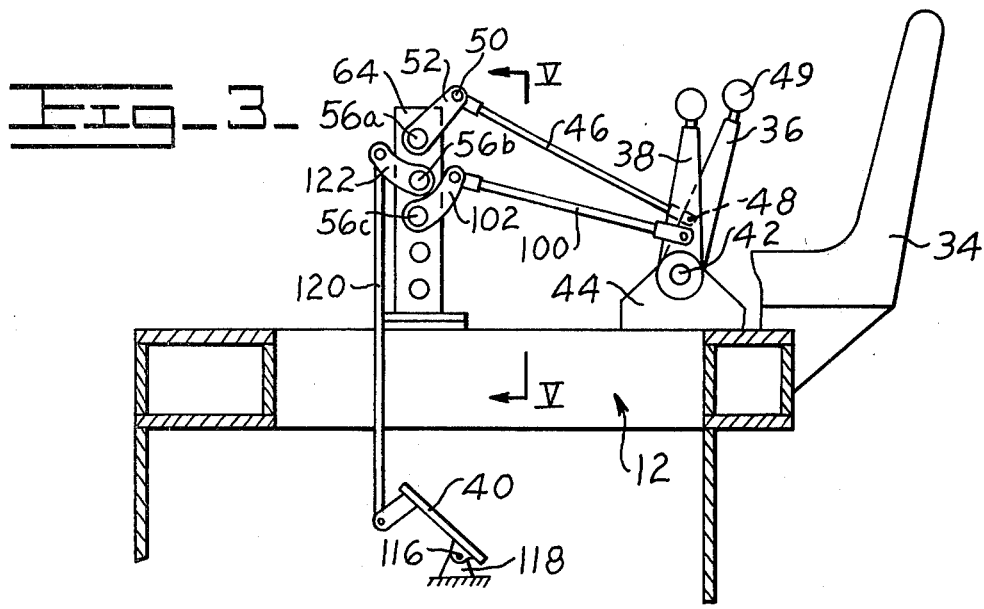
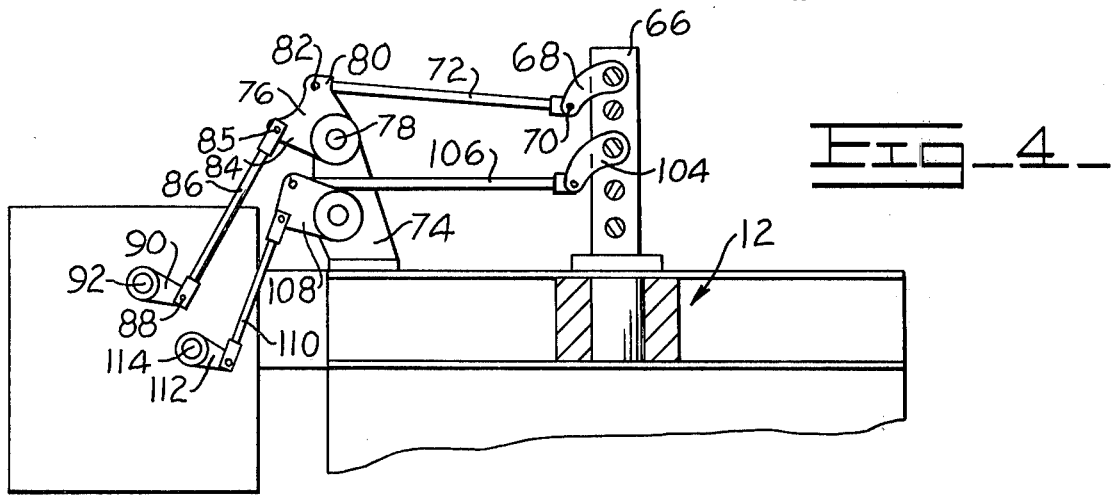
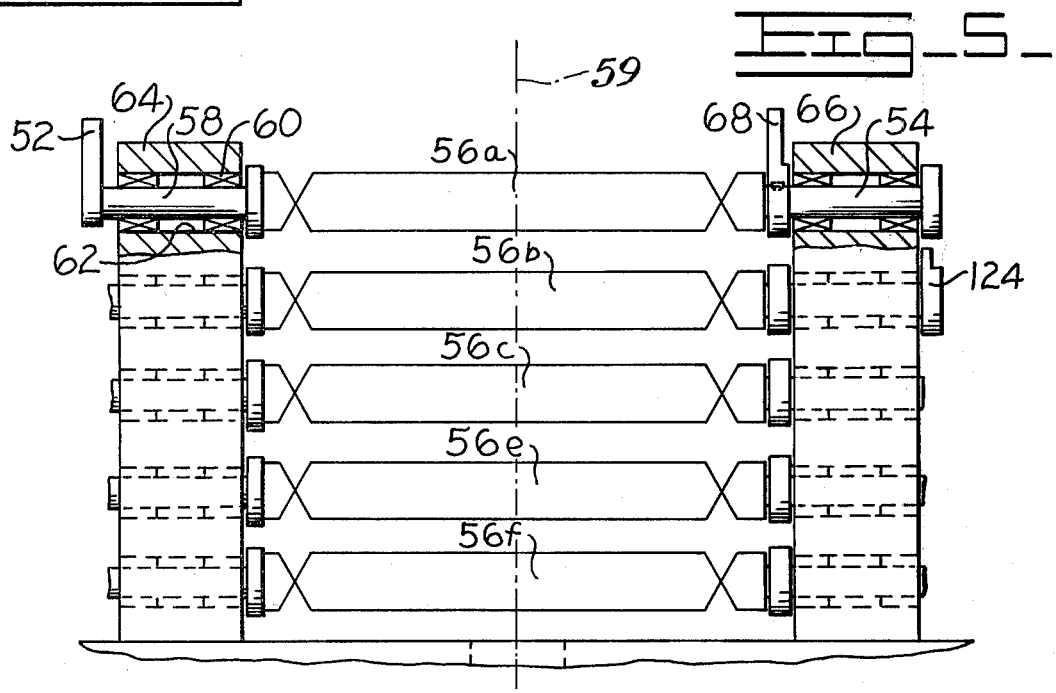

CONTROL LINKAGE FOR CROSSING PIVOTAL JOINT

BACKGROUND OF THE INVENTION

1. Field of the Invention

This invention relates to articulated vehicles and, more particularly, to linkages extending between at least two parts of the vehicle for controlling operating functions of the vehicle.

2. Description of the Prior Art

Articulated vehicles have been known and used for a long time so that the problems of transmitting control commands from an operator's station on a first frame to operate a functional piece of equipment on a pivotally attached second frame, are known. As a specific example on an articulated wheel loader, the operator's station is on a main frame with the engine, while the front wheels and bucket are on a loader frame pivotally attached to the main frame. The operator's commands are put into the control handles or pedals with some of the commands being transmitted to the loader frame by means of push-pull cables, electronic devices, or the like. Although these present day controls are effective and in widespread current use, they can occasionally have problems, such as fraying and breaking of the cables and malfunction of the electronics.

In certain vehicles, such as double articulated mining vehicles, the operator's station may be on an intermediate carriage with the engine and the like on a rear frame and with the bucket and the like on a front frame. Operator commands to the throttle, transmission or bucket must be transmitted to the front frame or rear frame across the articulated pivots such that the same degree of control must be transmitted no matter what the angular position of the frame is with respect to the intermediate carriage. With the prior push-pull cables, if the cable extended over a long run, kinking of the cable became a problem and if the cable extended over either a short run or long run, an excessive amount of force would be required to transmit motion from the actuator to the operating unit.

SUMMARY OF THE INVENTION

An improved control linkage is provided for articulated vehicles that is positive and accurate throughout the full range of relative movements between the respective pivoted frames of the vehicle. One or more operating levers or pedals are provided at the operator's station on one frame of the vehicle with each lever or pedal being connected through links and cranks to one end of a double universal joint whereby translational motion of the links is converted to rotary motion into the universal joint. Each universal joint is located to generally intersect the axis passing through the pivot pin between the frames of the vehicle and is connected through a link to translational functioning equipment on a second frame of the vehicle whereby movement of a lever or pedal on the one frame will operate the equipment on the second frame.

The connection between the levers and pedals on the one frame to the equipment on the other frame is accomplished with no geometry change at either end of the connection during turning. Mounting standards are fixed on the respective frames equidistant from the vertical axis of the pivot between the frames to provide anchors or holding devices for the ends of each universal joint. Linear slip between end mountings of the universal joints and the mounting standards provide for change of length when the joint is turned from an in line position to an angular position (such as when the one frame is pivoted relative to the second frame).

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a double articulated wheel loader-type vehicle incorporating our invention;

FIG. 2 is an enlarged plan view of the mid-portion of the double articulated vehicle of FIG. 1;

FIG. 3 is a cross-sectional view taken along the lines 3—3 of FIG. 2;

FIG. 4 is a cross-sectional view taken along the lines 4—4 of FIG. 2; and

FIG. 5 is an enlarged cross-sectional view taken along the lines 5—5 of FIG. 3.

DESCRIPTION OF THE PREFERRED EMBODIMENT

Referring to FIGS. 1 and 2, a double articulated wheel loader-type vehicle 10 illustrated and is comprised of a rear frame 12, an intermediate frame or carriage 14 and a front frame 16. It is to be understood that the present invention can be used with any single or double articulated vehicle.

The rear frame 12 supports an engine 18 for driving a pair of wheels 20 through a transmission (not shown). A drive line from the transmission passes through the intermediate carriage 14 and is operatively connected for driving the front wheels 22 on said front frame 16. The intermediate carriage 14 is pivotally connected by vertically aligned king pins 24 to the rear frame 12 and, by vertically aligned king pins 26, to the front frame 16. The front frame 16 has a pair of hydraulic cylinders 28 (only one being shown) for raising and lowering a bucket 30, or the like.

The intermediate frame 14 has a cab 32 affixed to one side thereof with a seat 34 located in the cab and forming an operator's station. From the operator's station, ready access is provided for an operator to reach a plurality of pivoted hand levers 36,38 and pivoted foot levers 40. Only two hand levers 36,38 and one foot lever or pedal 40 are shown, but it is understood that in normal usage there may be upwards of five or more hand levers and pedals at an operator's station. The hand levers and pedals are used to actuate operative parts of the vehicle, for instance, the throttle on the engine, the transmission range select, the transmission direction select, the bucket lift control, the bucket tilt control, and the like. For the purposes of illustration, only a limited number of levers and pedals have been illustrated together with their connection to operative parts of the vehicle, it being understood that the principles disclosed herein may be applied to the actuation of any number of operative parts of a vehicle.

As shown in FIGS. 2, 3, 4 and 5, the hand lever 36 is pivotally mounted to the intermediate frame 14 by a pin 42 passing through the upstanding ears 44 carried by the frame. The lever 36 is pivotally connected to one end of an elongate link 46 by pin 48 passing through the lever intermediate the pivot 42 and the hand ball 49 of the lever. The other end portion of the link 46 is pivotally connected by pin 50 to the crank 52 which is keyed to one end portion 54 of a double universal coupling 56a.

The double universal coupling 56a has its opposite end portions 54,58 rotatably mounted in bearings 60 seated in aligned openings 62 formed in the pair of vertically extending, spaced apart pedestals or standards 64,66. The pedestal or standard 64 is fixedly mounted on the intermediate frame 14 while pedestal or standard 66 is fixedly mounted on the rear frame 12. The pedestals 64,66 have vertical axes which are substantially parallel to each other and are parallel to the vertical axis of the king pin 24. The end portions 54,58 of the coupling 56a has a midportion 59 universally connected thereto so as to transmit rotary motion from end portion 54 to end portion 58 no matter what angle the axis of portion 54 takes with respect to portion 58. The axis of the pedestal 64 is spaced a distance on one side of the axis of the king pin 24 equal to the distance between the axis of the king pin 24 and the axis of the pedestal 66. As shown in FIG. 5, five coupling members 56a, 56b, 56c, 56d and 56e lie parallel to each other and extend between aligned openings 62 in the respective pedestals 64,66 with the axes of all the double universal couplings 56a, 56b, 56c, 56d and 56e lying in a common vertical plane.

The end portion 58 of the coupling 56a has a crank 68 rigidly fixed thereto on the side of the standard 66 facing the standard 64. The outer end of the crank 68 has a pin 70 pivotally securing the crank to a link 72. The rear frame 12 has an upstanding bifurcated bracket 74 with a pair of spaced apart shafts 78 extending between the legs of the bracket. A bell crank 76 is pivotally mounted to the bracket 74 about one of the shafts 78. One leg 80 of the bell crank 76 has a pin 82 pivotally connecting one end of link 72 to the crank with the other leg 84 of the bell crank 76 being pivotally connected by pin 85 to an elongate link 86. The other end of the link 86 is pivotally connected by pin 88 to a crank 90 which in turn is connected to a shaft 92. The shaft 92 extends into and is a part of a hydraulic control for the bucket lift system.

The operator grasping the ball 49 on the end of lever 36 can advance the lever in a counterclockwise direction. This will provide a translational movement to the link 46 which will rotate the crank 52 and coupling 56a, which in turn will rotate the crank 68 connected to the other end portion 58 of the coupling 56a. The crank 68 will shift the link 72 translationally to rotate the bell crank 76 thereby moving the link 86 to rotate the crank 90 and shaft 92 thereby lifting the bucket to the height desired.

It will be noted that the double universal coupling 56a, which can be of conventional construction, has its respective end portions 54,58 passing through aligned bearings 60 in the spaced apart standards 64,66. Sufficient clearance is provided between the sides of the cranks 52,68 and the standards 64,66, respectively, to permit axially shifting of the coupling 56a relative to the standards 64,66. The axial shifting is sometimes referred to as linear slip and is provided in the connection from the lever to the operating unit so as to provide for a change of length when the end portions 54,58 of the coupling 56a are pivoted relative to the midportion 59 of the coupling 56a. That is, when the rear frame 12 pivots about the vertical axis of the king pin 24 relative to the intermediate frame 14, the end portions 54,58 of the coupling 56a are turned at an angle with respect to the axis of the coupling 56a. In the process, a limited degree of elongating and/or foreshortening of the coupling 56a takes place. So as to provide for the elongation or foreshortening of the coupling 56a, the end portions 58,54 are permitted to slip linearly with respect to the standards 66,64 so as to prevent stresses and binding in the coupling 56a. The various connections between the cranks and the links allow for the linear slip caused by the elongation or foreshortening of the coupling 56a without binding. That is, as can be seen in FIG. 2, the connection between crank 68 and link 72 is affected by a ball and socket connection wherein a ball is formed on the outer end portion of the pin 70 which seats in a socket formed in the end portion of the link 72 so as to permit forces travelling along the axis of the link 72 to approach the transverse axis of the pin 70 at an angle other than 90° without binding. The ball and socket connections between the cranks and links are well known in the art and can be any one of the well known varieties available on the market.

As shown in FIG. 3, the lever 38 is connected through a link 100 to a crank 102 which in turn is rigidly affixed to the end of a coupling 56c, which is the third coupling down from the top, as shown in FIG. 5. The other end of this coupling 56c is connected to a crank 104 which in turn is connected to a link 106, bell crank 108, link 110, crank 112 and shaft 114 on the transmission so that shifting the lever 38 will operatively actuate the bucket tilt system.

The foot pedal 40 is pivoted to the frame 12 by a pin 116 passing through an upstanding bracket 118 carried by the frame. The pedal 40 is pivotally connected to a link 120 which is pivotally connected to a crank 122 rigidly carried by the outer end on an elongate end portion of the coupling 56b. The outer end of the other end portion of said coupling 56b is connected to a crank 124 which is pivotally mounted to a link 126 connected to one leg 128 of a bell crank 130 pivoted for transverse movement about a pin 132 passing through a bracket 134 on the frame 12. The other leg 136 of the bell crank 130 is connected through a link 138 to a governor 140. Depressing the pedal 40 on frame 14 will axially shift the governor 140, thereby feeding more fuel to the engine. Once again, the mountings of the end portions of the coupling 56b will permit linear slip of the ends of the coupling to allow for the change in length of the coupling 56b caused by pivotal movement of the rear frame 12 relative to the intermediate drame 14.

By way of summary, an improved, multiple linkage is provided across a pivotal joint between two articulated frame members of a vehicle with no geometry change at either end of the linkage when the frames pivot relative to each other. The pivoting movement of the lever or pedal is converted to translational movement of the link and to rotary motion and linear slip across the pivot connection between the two frames. The double universal joints have a centerline lying in a plane that is perpendicular to the axis of the king pin or pivot 24 between the frame members 12 and 14 which contributes to permitting the pivoting between the frames without binding of the linkages. The linear slip is used to provide for the change of length in the coupling when the frames are pivoted relative to each other about the pivot 24. The equidistant spacing of the centerlines of the standards or pedestals relative to the vertical axis of the pivot or king pin 24 contributes to the ability of the double universal joints 56a, 56b, 56c, 56d and 56e, to transmit the translational movement of the links to a rotary motion back to a translational movement without need for compensation. Virtually no additional effort is required to effect the actuation of the operative units on one frame by actuation of the levers or pedals in the operator's cab on another frame.

What is claimed is:

1. In an articulated vehicle having a first and a second frame pivotally connected together about a vertical axis, a link on said first frame, means on said first frame for imparting translation movement to said link, mounting means on each frame for rotatably carrying coupling means extending between the two frames, means on said first frame for converting said translation movement of the link to rotating movement of said coupling means, and means on said second frame for converting the rotating movement of the coupling means to actuating movement for an operating part of said vehicle.

2. In a vehicle as claimed in claim 1 wherein said mounting means includes a standard mounting on each of said frames with each standard having a vertical axis lying parallel to and equally spaced from the vertical axis of the pivotal connection between said frames and said coupling means having end portions carried by said standards.

3. In a vehicle as claimed in claim 2 wherein said means on the first frame for converting said translation movement to said rotating movement comprises a lever connected to one end portion of said link and a crank connected to the other end portion of said link and to said coupling means whereby movement of said lever translates said link and rotates said crank and said coupling means.

4. In a vehicle as claimed in claim 3 wherein said means on said second frame for converting said rotating movement comprises a second crank carried by said coupling means, a second link connected to said second crank and means connected to said second link for converting the translation movement of the second link to the appropriate motion for actuating the operating part of the vehicle.

5. In a vehicle as claimed in claim 2 wherein said end portions of the coupling means are linearly shiftable in said standards to allow for elongation and shortening of the coupling upon pivotal movement between said frames.

6. In an articulated vehicle having two frames pivotally mounted with respect to each other about a pivot having a vertical axis, the first of said frames having at least one actuation means pivotally mounted thereon, a standard fixed on each of said frames in equally spaced relation to the vertical axis of said pivot, at least one double universal joint extending between said standards, a crank on each frame connected to the end portions of said universal joint, a link connected between said actuation means and said crank on the first frame, at least one bell crank pivotally carried by the second frame, a link connecting said crank on the second frame to one leg of said bell crank, and a link connecting the other leg of said bell crank to an actuator on an operative part of the vehicle whereby movement of the actuation means on the one frame will rotate the universal joint to actuate the actuator on the other frame.

7. In an articulated vehicle as claimed in claim 6 wherein said actuation means is a hand operated, pivotally mounted lever.

8. In an articulated vehicle as claimed in claim 6 wherein said actuation means is a foot operated, pivotally mounted pedal.

9. In an articulated vehicle as claimed in claim 6 wherein said actuation means is at least one lever and at least one pedal, both pivotally mounted on said frame.

10. In an articulated vehicle as claimed in claim 6 wherein said standards have bearing means for rotatably and slidably receiving the end portions of said double universal joint whereby the end portions of said joint are permitted to axially slide relative to said standards to allow for elongation due to pivoting said frames about said pivot.

11. In an articulated vehicle having a first frame and a second frame pivotally mounted with respect to each other about a pivot having a vertical axis, the first of said frames having at least one pivotally mounted hand lever and at least one pivotally mounted foot pedal thereon, a standard fixed on each frame in equally spaced relation to the vertical axis of said pivot, at least two double universal joints extending between said pair of standards, a crank mounted on each end portion of each of said joints, a link connecting said lever to one of said cranks on one of said joints, a second link connecting said pedal to one of said cranks on the other of said joints, bell cranks pivotally carried by said second frame, means for connecting the crank on each of said joints to one leg of each of said bell cranks, and means connecting the other leg of each of said bell cranks to an actuator on an operative piece of equipment whereby movement of the lever and the pedal on the one frame will rotate the universal joints to move the actuator on the other frame.

12. In an articulated vehicle having a first and a second frame pivotally connected together about a vertical axis, means on said first frame for creating translational movement, coupling means extending between fixed uprights on the two frames, means on said coupling means for receiving the translational movement from said first-named means and for rotating said coupling means, means on said second frame for receiving the rotating movement of the coupling means and for actuating an operating part of said vehicle, and means on said uprights permitting axial shifting of said coupling means to accommodate for elongation due to pivoting said frames about said axis.

13. In a vehicle as claimed in claim 12 wherein said fixed uprights are mounted on each of said frames with vertical axes lying parallel to each other and being equally spaced from the vertical axis of the pivotal connection between said frames.

14. In a vehicle as claimed in claim 13 wherein said means on the coupling means being a crank connected to said coupling means and to a link connected to said first-named means.

* * * * *

UNITED STATES PATENT AND TRADEMARK OFFICE
CERTIFICATE OF CORRECTION

PATENT NO. : 4,068,733
DATED : January 17, 1978
INVENTOR(S) : Gerald P. Simmons and Frank A. Grooss It is certified that error appears in the above-identified patent and that said Letters Patent are hereby corrected as shown below:

Column 1, line 57, delete "translational" and insert therefor --one piece of--.

Column 5, line 17, change "mounting" (2nd occurrence) to read --mounted--.

Signed and Sealed this

Second Day of May 1978

[SEAL]

Attest:

RUTH C. MASON
Attesting Officer

LUTRELLE F. PARKER
Acting Commissioner of Patents and Trademarks